United States Patent
Power et al.

(10) Patent No.: US 7,492,888 B2
(45) Date of Patent: Feb. 17, 2009

(54) METHOD AND APPARATUS FOR ASSIGNING PRIORITIES BY APPLYING DYNAMICALLY-CHANGEABLE BUSINESS RULES

(76) Inventors: Mark J. Power, 1332 Yorkshire La., Carol Stream, IL (US) 60188; Anthony J. Dezonno, 233 Pinewood La., Bloomingdale, IL (US) 60108; Roger A. Sumner, 1078 Shabbona Trail, Batavia, IL (US) 60510; Carlo Bonifazi, 2543 Brunswick Cir., Woodridge, IL (US) 06517; Jeffrey D. Hodson, 1670 LaPalma Ct., Wheaton, IL (US) 60187; Craig R. Shambaugh, 2223 Barger Ct., Wheaton, IL (US) 60187; Mark J. Michelson, 2N078 Mulhern Dr., Elburn, IL (US) 06119; Robert P. Beckstrom, 811 Tamms La., Bolingbrook, IL (US) 60440

( * ) Notice: Subject to any disclaimer, the term of this patent is extended or adjusted under 35 U.S.C. 154(b) by 463 days.

(21) Appl. No.: 10/253,120

(22) Filed: Sep. 24, 2002

(65) Prior Publication Data

US 2004/0057570 A1    Mar. 25, 2004

(51) Int. Cl.
H04M 3/00   (2006.01)
(52) U.S. Cl. ............... 379/265.13; 455/456.1
(58) Field of Classification Search ..............
379/265.01–265.14, 266.01–266.1; 455/404.2,
455/435.3, 456.1, 456.3, 512, 527
See application file for complete search history.

(56) References Cited

U.S. PATENT DOCUMENTS

| | | | |
|---|---|---|---|
| 4,953,204 A * | 8/1990 | Cuschleg et al. ....... | 379/266.05 |
| 5,127,004 A | 6/1992 | Lenihan et al. | |
| 5,140,611 A | 8/1992 | Jones et al. | |
| 5,268,903 A | 12/1993 | Jones et al. | |
| 5,555,179 A | 9/1996 | Koyama et al. | |
| 5,765,033 A | 6/1998 | Miloslavsky | |
| 5,793,861 A * | 8/1998 | Haigh ...................... | 257/693 |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 5,963,625 A * | 10/1999 | Kawecki et al. ........ | 379/127.01 |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,097,802 A * | 8/2000 | Fleischer et al. ....... | 379/211.02 |

(Continued)

FOREIGN PATENT DOCUMENTS

GB    2333173 A  *  7/1999

*Primary Examiner*—Sam Bhattacharya (57) ABSTRACT

A novel method and apparatus which in one embodiment provides for prioritizing and presenting calls routed from callers through a communication network to an agent station having an associated agent, where the calls are based on voice-dialog communication and/or text-dialog communication. The method includes the steps of receiving a call from the communication network, determining a contact evaluation parameter associated with the call, and applying one or more selected business rules to the contact evaluation parameter to generate a priority value corresponding to the call. The call is assigned the priority value and is routed to a selected agent station. The call is displayed with an indication of its assigned priority value so that the agent may service the calls in priority order.

35 Claims, 3 Drawing Sheets

U.S. PATENT DOCUMENTS

| | | |
|---|---|---|
| 6,097,806 A | 8/2000 | Baker et al. |
| 6,108,711 A | 8/2000 | Beck et al. |
| 6,138,139 A | 10/2000 | Beck et al. |
| 6,167,395 A | 12/2000 | Beck et al. |
| 6,170,011 B1 | 1/2001 | Beck et al. |
| 6,175,563 B1 | 1/2001 | Miloslavsky |
| 6,175,564 B1 | 1/2001 | Miloslavsky et al. |
| 6,185,292 B1 | 2/2001 | Miloslavsky |
| 6,289,373 B1 | 9/2001 | Dezonno |
| 6,321,205 B1 * | 11/2001 | Eder ............................. 705/7 |
| 6,345,305 B1 | 2/2002 | Beck et al. |
| 6,373,836 B1 | 4/2002 | Deryugin et al. |
| 6,389,007 B1 | 5/2002 | Shenkman et al. |
| 6,393,015 B1 | 5/2002 | Shtivelman |
| 6,408,066 B1 * | 6/2002 | Andruska et al. ...... 379/265.12 |
| 6,704,409 B1 * | 3/2004 | Dilip et al. ............. 379/265.02 |
| 6,721,416 B1 * | 4/2004 | Farrell ................... 379/265.07 |
| 6,732,156 B2 | 5/2004 | Miloslavsky |
| 6,798,877 B2 * | 9/2004 | Johnson et al. ........ 379/266.01 |
| 7,039,176 B2 * | 5/2006 | Borodow et al. ....... 379/265.02 |
| 7,068,775 B1 * | 6/2006 | Lee ....................... 379/265.02 |

* cited by examiner

FIG. 3

METHOD AND APPARATUS FOR ASSIGNING PRIORITIES BY APPLYING DYNAMICALLY-CHANGEABLE BUSINESS RULES

FIELD OF THE INVENTION

The present invention relates generally to a method and apparatus for routing calls to agents of a transaction processing system and/or an automatic call distribution system ("ACD"), and more specifically to a method and apparatus for prioritizing and presenting calls to an agent based on dynamically changeable business rules.

BACKGROUND

Systems which automatically distribute customer contacts or calls (generically referred to as "ACD") are often employed in telemarketing environments in which agents stationed at agent stations answer many different types of customer contacts (e.g., VoIP, emails, facsimile, chat room dialog, instant messages, other Internet contacts, etc.) from customers during a work day. As referred to herein, an ACD may be referred to as an automatic call distributor or an automatic contact distributor because the ACD handles a variety of communication media. In other words, the ACD handles many forms of communication, not just telephone calls in which a potential customer speaks with an agent. The term "ACD" may apply to any type of transaction processing system, and need not apply only to dedicated telemarketing systems or automatic call distributors. In some known ACD's, the agent may receive certain information about the type of customer call (i.e. contact) on a visual display at the agent set when a call or contact is distributed to the agent. An ACD is any such system which performs these functions and, for example, may employ a wide variety of architectures including integrated centralized systems, distributed systems, systems using one or more personal computers or servers, etc.

In some embodiments, ACD's may be used to support a number of different vendors in their telemarketing effort, and in such marketing environments, the agent is typically in communication with the customer or potential customer with respect to or on behalf of a particular vendor. The next contact that the agent processes may be on behalf of the same vendor or on behalf of a different vendor. In another embodiment, ACD's may be, used exclusively by or on behalf of a single vendor such that all of the contacts processed by the agent involve one particular vendor.

Often, a customer call is distributed to an agent that involves interactive voice dialog. This means a normal two-way verbal exchange. An ACD, however, may also distribute a non-voice dialog contact (i.e. call) to the agent. This does not involve direct two-way speech between the agent and the customer or caller. Non-voice dialog communication may be, for example, emails, facsimile, chat room dialog, instant messaging, Internet, etc. and the like. This is becoming more common as Internet traffic and the volume and frequency of electronic sales transactions increase. Handling of the non-voice dialog contact may, in some instances, require a specialized device or subcomponent of the ACD. In this situation, the agent may typically view text on a display screen that the caller typed in or transmitted. In response, the agent may provide information to the contact or request information from the caller, via the keyboard or other input device. Essentially, the dialog between the agent and the caller occurs on a display screen. Further, the agent may handle multiple calls. For example, the agent may typically handle two to five (or more) simultaneous non-voice dialog communications or transactions, which may be presented as two to five separate dialog windows on the display screen, which windows may, for example, be tiled or layered. Of course, the number of simultaneous transactions may vary significantly.

Typically, incoming calls are routed to the agent on a "time-stamp" or "first-come-first-serve" basis, whether the incoming call is a voice-based call or a text-based call. However, this may not be efficient, especially when real-world events mandate that such incoming call be serviced in accordance with a different priority scheme. Known transaction processing systems do not allow the assigned priority of incoming calls to be easily or quickly modified in response to important events, whether such events are business driven market conditions, or events of an emergency nature.

A need exists to permit the transaction processing system to apply certain rules to the incoming calls to establish a priority hierarchy, which priority hierarchy may be quickly and easily changed in real time to respond to real-world events or changing business conditions.

SUMMARY

The disadvantages of present transaction processing systems may be substantially overcome by a novel apparatus and method for assigning priorities by applying dynamically-changeable business rules.

More specifically, in one embodiment, a novel method provides for prioritizing and presenting calls routed from callers through a communication network to an agent station having an associated agent, where the calls are based on voice-dialog communication and/or text-dialog communication. The method includes the steps of receiving a call from the communication network, determining a contact evaluation parameter associated with the call, and applying one or more selected business rules to the contact evaluation parameter to generate a priority value corresponding to the call. The call is then assigned the priority value and is routed to a selected agent station. The call is displayed with an indication of its assigned priority value so that the agent services the incoming calls in priority order.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

DETAILED DESCRIPTION

In this written description, the use of the disjunctive is intended to include the conjunctive. The use of definite or indefinite articles in not intended to indicate cardinality. In particular, a reference to "the" object or thing or "an" object or "a" thing is intended to also describe a plurality of such objects or things.

Figure 1:
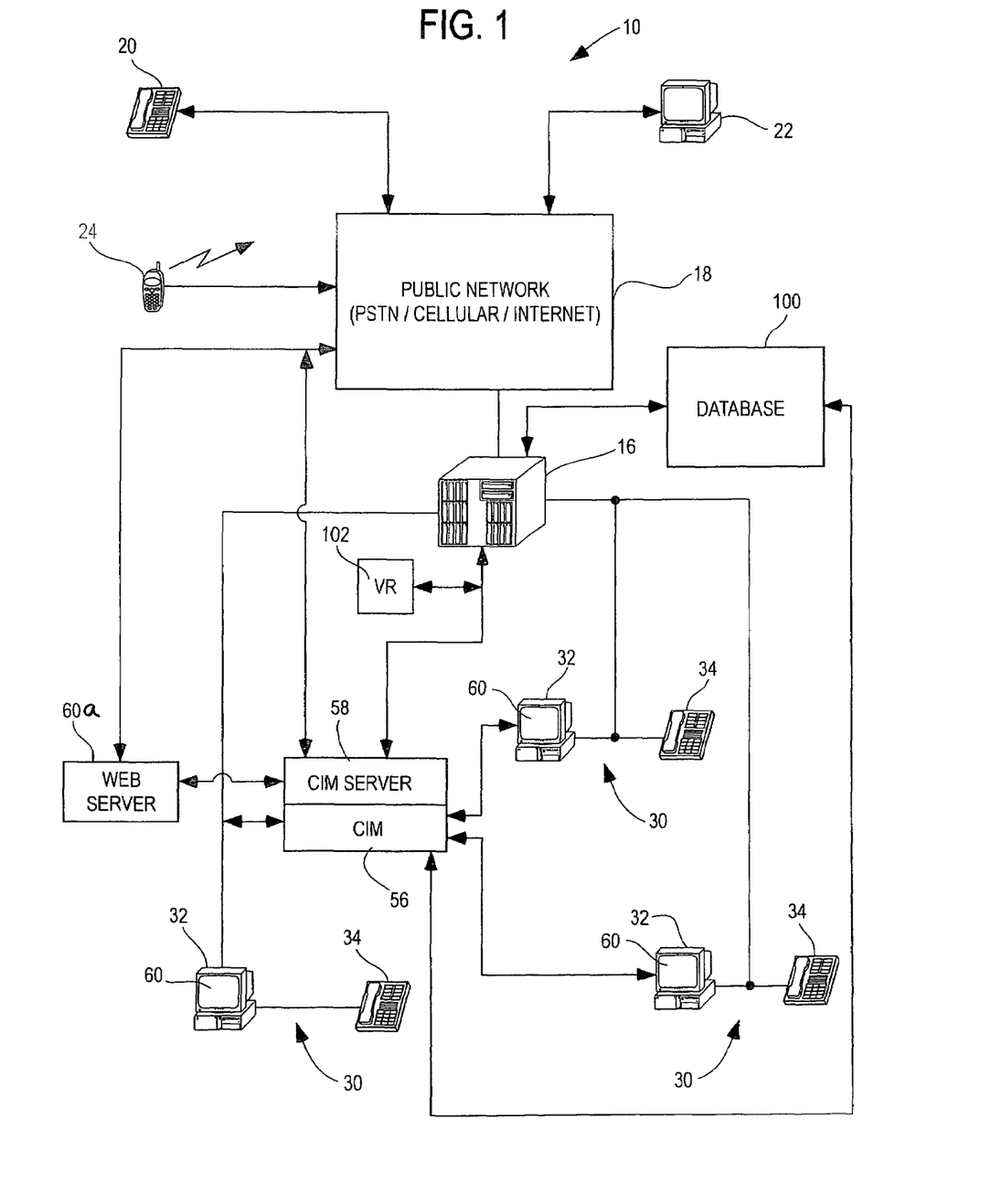
FIG. 1 is a pictorial representation of a specific embodiment of a transaction processing system.

Referring now to FIG. 1, an exemplary embodiment of a system 10 for facilitating routing of incoming calls or contacts ("transactions") to agents associated with a transaction processing system, which may also be referred to as an automatic call distribution or automatic contact distribution system (ACD) 16, is shown generally. The ACD 16 may process both voice-dialog communications or transactions, as well as non-voice dialog communications and transactions, as described hereinafter. The present invention may be implemented in numerous types and sizes of systems for distributing calls to selected ones of a plurality of agents. Examples of ACD systems that may be used in the present invention are the SPECTRUM ACD and Transcend ACD products available from Rockwell FirstPoint Contact.

Other types of call distribution systems including, for example, distribution systems or those using one or more personal computers or servers, may also be used. Some other suitable ACD's are disclosed in U.S. Pat. No. 5,268,903, issued to Jones et al. on Dec. 7, 1993, entitled "Multichannel Telephonic Switching Network With Different Signaling Formats and Connect/PBX Treatment Selectable For Each Channel," U.S. Pat. No. 5,140,611, issued to Jones et al. on Aug. 18, 1992, entitled "Pulse width Modulated Self-Clocking and Self-Synchronizing Data Transmission and Method for a Telephonic Communication Switching System," U.S. Pat. No. 5,127,004, issued to Lenihan et al. on Jun. 30, 1992, entitled "Tone and Announcement Message Code Generator for a Telephonic Switching System and Method," U.S. Pat. No. 6,289,373 B1, issued to Dezonno on Sep. 11, 2001, entitled "Method of Processing E-Mail in an Automatic Call Distributor," and U.S. Pat. No. 6,097,806, issued to Baker et al. on Aug. 1, 2000, entitled "ACD with Multi-Lingual Agent Position," the disclosures of which are hereby incorporated by reference in their entirety.

In the illustrated embodiment of FIG. 1, a customer or caller may be connected to the ACD 16 through a public switched telephone network (PSTN) 18 or other communication network, which caller may connect to the PSTN through a standard telephone set 20, a computer 22, a cellular telephone 24, or any suitable communication device. Note that the term "caller" as used herein does not necessarily mean that the contact or person using the telephone 20, for example, initiated the call to the agent. Notably, the agent of the system 16 may have initiated the call to the contact. Accordingly, the term "caller" shall broadly refer to the contact or potential customer even though, for example, the agent may have originated or initiated the call or contact. Additionally, the term "call" may be a telephone call, or it may be any other form of communication (emails etc.) as set forth above. Additionally, the term "incoming call" does not necessarily mean that the call must have originated external to the transaction processing system, and may have been initialed by the agent to a potential customer instead.

In the illustrated embodiment, multiple agent stations or terminals 30 are shown coupled to the ACD 16. For purposes of illustration, only three agent stations 30 are shown, but any suitable number of agents may be coupled to the ACD 16. The agent stations 30 may also include agent station computers 32 or terminals, and/or associated telephone sets 34.

Figure 2:
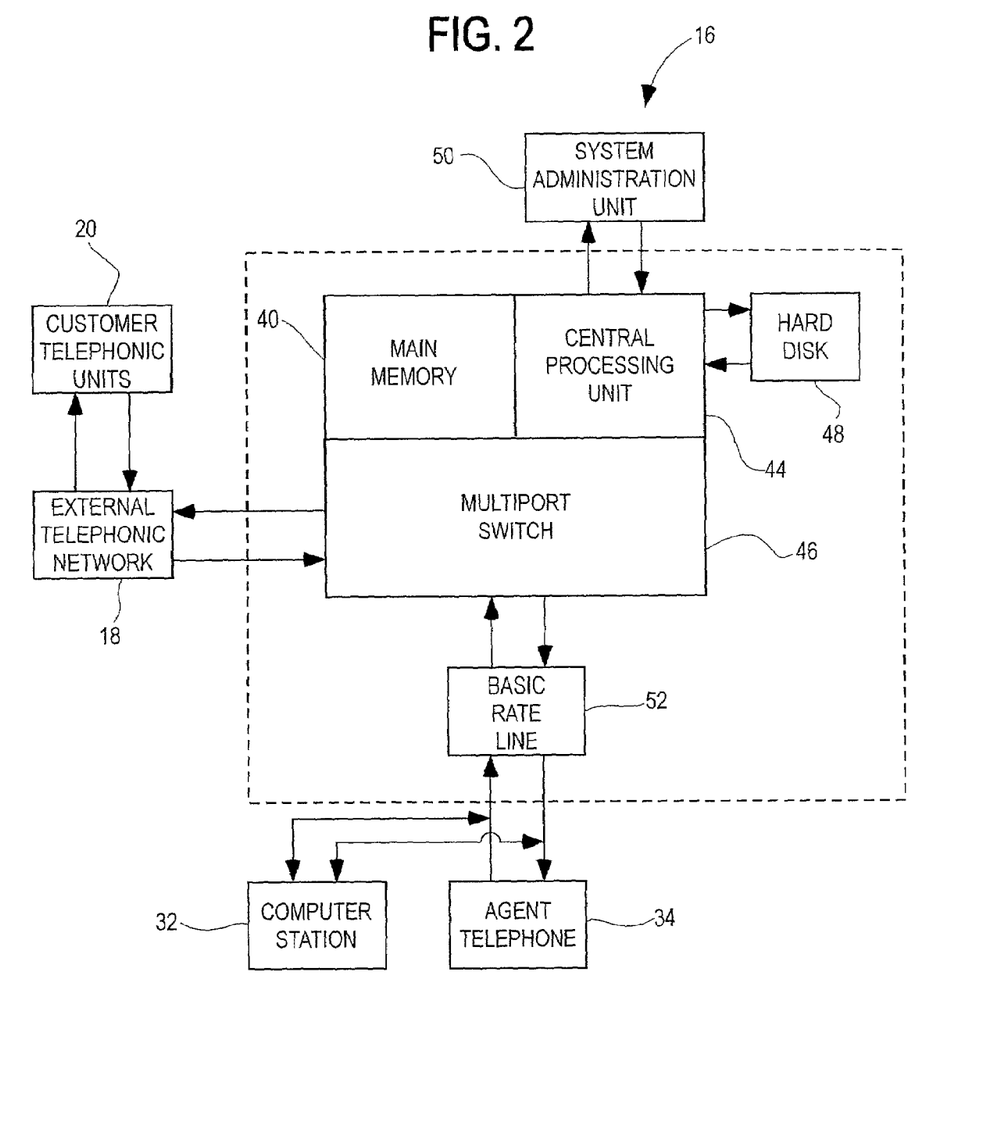
FIG. 2 is a functional block diagram of a specific example of a known automatic call distributor system.

Referring now to FIG. 2, there is shown an example of the ACD 16 in greater detail. The ACD 16 may include hardware and/or software and, for example, may include a main memory 40, a central processing unit 44 and a multiport switch 46, each of which may be separate units, distributed components, or integrated at a single location or single cabinet. The multiport switch 46 as shown is coupled to the PSTN 18, which in turn, is connected to customer telephones 20 or other communication devices (20, 22, or 24). The central processing unit 44 may include storage, such as hard disk storage 48, and may also be coupled to a system administration unit 50. The ACD 16 is connected through a suitable communication link to the plurality of agent telephonic sets 34, for example, through a basic rate line 52, as is known in the art. The agent station computers 32 and the agent telephone sets 34 may be incorporated into single units, as is known in the art.

The illustrated ACD 16 may handle voice communication and may also handle non-voice communication, such as emails, facsimile, chat room dialog, instant messaging, Internet, etc. Non-voice dialog communication is another form of contact communication and the ACD 16, when configured and coupled to appropriate hardware and/or software devices, as described below, is not limited to processing voice-based telephone calls. The ACD 16 may be a single integrated device, or may include distributed hardware and software. In one specific embodiment, the SPECTRUM ACD product available from Rockwell FirstPoint Contact may include a non-voice dialog communication processor, such as a Contact Integration Manager (CIM) 56, as shown in FIG. 1, which may, for example, be a CIM Release No. 1.1, which is also available from Rockwell FirstPoint Contact. In the specific embodiment shown, the communication processor 56 or CIM (also referred to as non-voice dialog communication processor or communication processor) may handle the non-voice dialog communication between the customer or caller, and the agent.

In the embodiment of FIG. 1, the communication processor 56 may be operatively coupled to the ACD 16 and to the agent computer 32 or agent stations 30. Typically, the communication processor 56 receives email, chat room dialog, facsimile, instant message, Internet communication, and the like from a communication processor server 58. The communication processor server 58, in turn, may receive additional non-voice dialog contact communication from a web server 60a, which may be connected to the PSTN 18 or some other communication network, as is known in the art.

In one specific embodiment, the communication processor 56 may be separate from the ACD 16 and operatively coupled to the ACD 16. Alternatively, the communication processor 56 may be integrated into a portion of the ACD 16 or any other processor or processors in the system. In another embodiment, at least a portion of the communication processor 56 functionality may be part of the agent station computer 32, which may be, for example, a personal computer. The communication processor 56 may be any suitable computing device, such as, for example a microprocessor, RISC processor, mainframe computer, work station, single-chip computer, distributed processor, server, controller, micro-controller, discrete logic computer, remote computer, personal computer, internet computer, web computer, and the like.

With respect to the apparatus and method described herein, the term ACD 16 is used interchangeably to mean either the ACD and/or the communication processor 56, or a combination of both. Both terms relate to a "transaction processing system" and because the ACD 16 and the communication processor 56 may be so closely related or their functions so distributed that a meaningful distinction may not be able to be made with respect to which particular component is performing a specific step described. Accordingly, for purposes of illustration only, the below-described method will be described in terms of an embodiment in which the ACD 16 may be performing the step or the communication processor 56 may be performing the step, even though a separate component or subcomponent, such as the other of above-mentioned components, may actually perform the step or process.

The communication processor 56 in the illustrated embodiment of FIG. 1 is configured to facilitate sending and receiving non-voice dialog communication between the caller and the agent or agent terminal 30, and to transmit a signal to the ACD 16 indicating that the communication processor received the non-voice dialog communication from the caller. In a specific embodiment illustrated in FIG. 1, the signal from the communication processor 56 to the ACD 16 may create a "call appearance" so that the ACD is brought into the communication "loop," and is able to track the contact. The call appearance simulates to the ACD 16 the appearance of a voice-type call even though a voice-type call is not present. Once the call appearance to the ACD 16 has been made, the ACD can queue and track the non-voice dialog communication to the appropriate agent as if the call were an ordinary interactive voice-dialog call, even though the ACD may not utilize or connect its voice channel to the agent. Rather, the communication processor 56 may handle the non-voice dialog communication and provide the call to the agent, and also inform the ACD 16 regarding the status and initiation of the call.

Accordingly, once the call appearance has been made, the ACD 16 in the illustrated embodiment of FIG. 1 may select a particular agent to receive the non-voice dialog communication from the communication processor 56 using any suitable selection technique, and then causes the non-voice dialog communication to be routed to the selected agent by the communication processor. In known automatic call distribution systems, selection of the agent is performed according to any suitable method including known methods, such as the agent's availability, time past since prior contact, number of calls previously processed by the agent, skill or efficiency rating of the agent, and the like.

In known ACD systems, when such a contact is routed to an agent, the system notifies the agent that a call has arrived, by means known in the art. For example, a message may appear on the agent station 30 and/or an audible signal may be sent to the agent. The message may be preferably displayed on an agent station display screen or other known display device 60. If the call is a voice dialog communication, the agent speaks with the caller. If the call is a text-based communication, the agent may, for example, communicate with the caller by reading and typing messages on the agent station 30 or agent computer.

The transaction processing system 16 preferably routes voice dialog communication to the selected agent station 30 for servicing by an associated agent using the agent telephone 34 or headset. In conjunction with the communication processor 56, the transaction processing system 16 may, for example route non-voice dialog or text-based communication to the selected agent station. As set forth above, the communication processor 56 need not be separate or apart from the transaction processing system 16 and may be operatively incorporated into the transaction processing system. In operation, the transaction processing system 16 and/or the communication processor 56 routes calls from the callers to the agents, where the incoming calls may be voice dialog communication or non-voice dialog communication, such as VoIP (voice-over Internet protocol), email, facsimile, chat room dialog, instant messages, and other Internet contacts.

In known systems, however, whether voice-based dialog or text-based dialog, the call is typically routed to the agent based on the time received. Accordingly, the agent may have several calls simultaneously pending, which he or she presumably services in the order received. Although it is not a goal to have multiple callers pending on "hold," given that some calls will inevitably be placed on hold, however, it is desirable to service the highest priority callers first before lower priority callers. Known transaction processing systems do not prioritize the calls for the agent to permit servicing of the calls in this way. Such systems do not prioritize calls based upon the content of the call, nor do such systems prioritize or reprioritize such calls depending upon changing business conditions or real world events.

Figure 3:
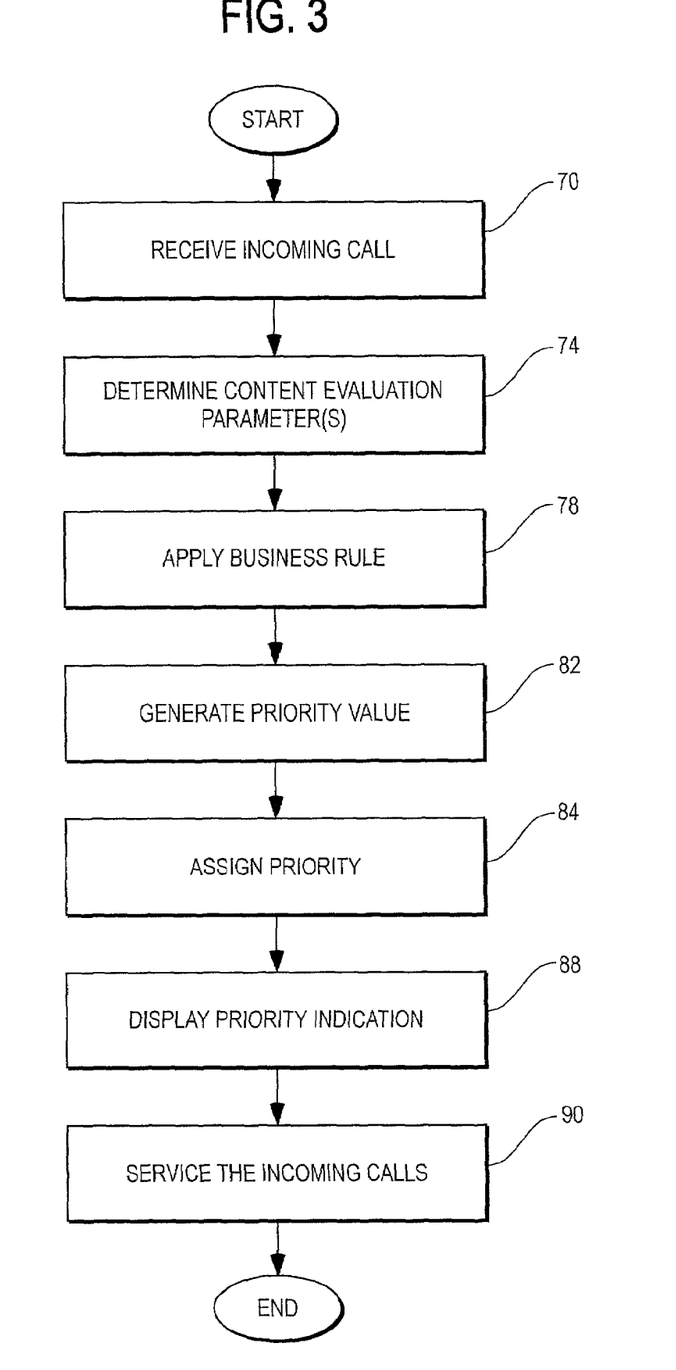
FIG. 3 is high-level process flowchart.

Referring now to FIGS. 1 and 3, FIG. 3 is a flowchart illustrating an example of a high-level functional process for prioritizing. The high-level processing steps will now be briefly described as an overview. As described above, it is immaterial to the scope of this invention whether the processing and handling of the calls is handled by the ACD 16 or by the communication processor 56, some other system resource, or a combination of system resources. Further, it is immaterial what processor or at what location the call is processed.

In one embodiment, the calls are received by the ACD 16 and fully processed in accordance with the present invention before the calls are routed to the communication processor 56 and to the agent station 30. In an alternate embodiment, the calls received by the ACD 16 may be first routed to the communication processor 56 and agent station 30 such that the communication processor fully processes the calls in accordance with the present invention. However, for purposes clarity and illustration only, processing and handling of the calls shall be referred to as being handled and/or processed by the communication processor 56, even though the ACD 16 or some other combination of system resources may perform the processing steps.

In the embodiment illustrated in FIGS. 1 and 3, the call may be received by the ACD 16, as shown in a step 70. The call may then be routed to the communication processor 56 for processing. The calls may be routed to the ACD 16 from any suitable communication network, such as the PSTN 18 (public switched telephone network), local area network, direct wired connection, and the like. As described above, the calls may be voice-dialog communication or text-dialog communication.

In operation, once the call is received, a contact evaluation parameter associated with the call is determined, as shown in a step 74. Next, one or more selected business rules are applied to the contact evaluation parameter, as shown by a step 78, to generate a priority value corresponding to the call, as shown in a step 82. The priority value is then assigned to the call, as shown in a step 84, and an indication of each of the calls based on the assigned priority value is displayed to the agent, as shown in a step 88. In this way, the agent may service the calls in priority order, as shown in a step 90.

The indication of priority associated with any particular incoming call may be presented to the agent in any suitable form. In one embodiment, the calls are listed in priority order, with the call having the highest priority listed first. Alternatively, the calls may be listed in order of arrival but a priority indication, such as a number or symbol, may be associated with the call entry on the agent's display screen 60. Other ways of indicating priority may also be used. For example, the screen entry may be set to blink or flash the calls having the highest priority, or the incoming calls may be displayed in certain colors to indicate priority. Perhaps the calls having the highest priority are displayed in red. Any suitable method may be used to permit the agent to view and understand the priority associated with each call shown on his or her display screen 60.

Turning now to the contact evaluation parameter, this parameter is essentially the criteria that determines how a priority value will be generated and/or what business rules will be applied to the priority value. The contact evaluation parameter may either be directly set or may be determined based upon known information, as will be described below. Alternatively, the contact evaluation parameter may identify or specify one or more business rules to apply to the call to generate the priority value.

In one specific example, if the call is a voice-based communication, the contact evaluation parameter may be directly set to a "voice-priority" mode. This means that all voice-based calls receive the highest priority. In most situations, this is reasonable because voice-based calls preferably should not be placed on "hold" for prolonged periods of time, whereas text based calls need not be responded to immediately. If the contact evaluation parameter has been set to a voice-priority mode, then one business rule applied may specify that any incoming voice-based calls is assigned a priority value greater than all calls not having a contact evaluation parameter equal to voice-priority. Accordingly, in this example, all voice-dialog communications may receive a higher priority that any pending or text-dialog communication. One or more business rules may be applied and/or combined.

Thus, in this specific scheme, an voice-based call will be assigned a higher priority than an existing pending text-based call. Clearly, the priority of pending text-based calls may be downgraded or reduced ("bumped") due to the receipt of a higher priority voice-based incoming call. The relative priorities of incoming calls presented to the agent on the agent's display 60 may be dynamically updated and/or changed in real-time, or on a periodic basis. For example, such relative priorities may be updated and/or changed every five seconds. Of course, the updating and changing of the relative priorities assigned to the incoming calls applies to all of the scenarios described herein.

Additionally, another business rule may be used in conjunction with the above-described business rule to specify that additional voice-dialog communications may be assigned a priority value based upon a chronological time that the incoming call was received. Thus, the combination of the above-described business rules may specify that the priority of voice-based calls are based on time of arrival, but that all such voice-based calls are given a higher priority than any text-based calls. This is most likely a typical practical implementation due to the urgency of voice-based incoming calls.

However, in another embodiment, the "polarity" of the rules in the above-described example may be reversed such that contact evaluation parameter may be directly set to a "text-priority" mode, which is the converse of the voice-priority mode. The business rule applied in this specific example may, for example, specify that a text-based call is assigned a priority value greater than all incoming calls not having a contact evaluation parameter equal to text-priority. Accordingly, all text-dialog communications may receive a higher priority than any pending or incoming voice-dialog communication. This may be desirable, for example, in a brokerage house where it is important to have a record of all transactions. The written text of the message provides the appropriate audit trail.

Again, the above-described business rule may be used in conjunction with other business rules, for example, to specify that subsequent text-based calls may be placed in a chronological priority, and wherein all such text-based calls are give a higher priority than any voice-based calls. Directly setting the contact evaluation parameter to "voice priority" or to "text priority" is strictly a business decision based upon the nature of the business entity and the type of marketing approach involved.

As another example, the contact evaluation parameter may be directly set to a "geographical priority." In this situation, all incoming calls from a particular geographical location may be given high priority. Perhaps all calls, whether text-based or voice-based, originating from Washington, D.C., may receive a higher priority value. Again, management would make such a decision based upon the nature of their business. Further, the contact evaluation parameter and/or the business rules specified may be dynamically changed or reassigned to change or modify the priority value associated with a particular call. This may be performed in response to real-world events or changing business conditions.

For example, a disaster, an emergency, or very important business event may have occurred in Houston, Tex. In one specific embodiment, in response to learning of such events, the business rule applied above may be changed to provide that all calls originating from Houston, Tex., rather than from Washington, D.C., are given the highest priority. Thus, incoming call originating from Houston, Tex. may be assigned a higher priority than other incoming calls.

In some embodiments, the contact evaluation parameter and/or associated business rules may be preferably updated and changed in real time, and such changes may be performed very quickly so that the transaction processing system can permit the agents to respond to calls based upon a new priority scheme. Accordingly, as illustrated in the above-described example, the agents associated with the ACD 16 can service calls originating from Houston, Tex. ahead of all other calls. This permits the transaction processing system 10 to be rapidly configured to respond to real-world events and changing business conditions. Changing the contact evaluation parameter or the business rules may be performed by a supervisor, manager, or other administrative personnel, as is known in the art.

With respect to the "geographical priority" example described above, as is known in the art, the origination of the incoming call may be ascertained from the ANI (automatic number identification) fields associated with the incoming call. For example, the area code of the incoming call obtained from the ANI field may be used to identify the general geographical location of the caller, as is known in the art.

In another specific example, the contact evaluation parameter may be set to "close-of-business-time." When configured in this way, incoming calls placed within, for example, fifteen minutes before close of business at the caller's location may receive a higher priority than other incoming calls. This may permit the caller to complete the transaction and remit payment before his or her business closes for the day, which may enhance the efficiency of the transaction processing system 10. All other variables being equal in this specific example, if the transaction processing system 10 and agents are located in the central standard time zone, and two incoming calls arrive at 5:50 CST, it is preferably to service an incoming call from Denver ahead of a similar incoming call placed from San Francisco. This is because it would be 4:50 PM in Denver (Rocky Mountain Time), and very near to the close of business in Denver, while the time would only be 3:50 PM in San Francisco (Pacific Standard Time). Accordingly, the call from Denver would be assigned a higher priority than the call from San Francisco.

In another specific embodiment, the contact evaluation parameter corresponding to the incoming call may be derived from information obtained from a database 100. Any suitable database 100 or memory system may be used, which database or memory may be incorporated within the ACD system 16, the transaction processing system 56, or the agent station 30. The database 100 may also be remotely located from the above-mentioned components and may be connected thereto by a local area network or other communication link. Note that in FIG. 1, the database 100 is shown coupled to both the ACD system 16 and the communication processor 56, but in practice, the database 100 need only be connected so as to communicate to one or the other. The database 100 may be accessed by an index or pointer derived from data contained in a DNIS or an ANI field associated with the incoming call.

As is known in the art and described in part above, an incoming call may include the ANI (automatic number identification) fields and/or DNIS (dialed number information service) fields, which may contain specific information corresponding to the incoming call. In one specific embodiment, the ACD 16 or the communication processor 56 may inspect the ANI data to determine the caller's originating calling number. This is also referred to as caller-ID. Once the caller's originating number is ascertained, the originating number may be used to access the database 100 to identify the caller. The originating number may be used directly as a pointer into the database 100 or may be manipulated to conform to a suitable indexing standard, as may be defined by the database.

Alternatively, DNIS (dialed number information service) fields associated with the incoming call may provide certain information, as is known in the art. Such call-specific parameters may be provided by the caller in response to automated prerecorded messages initially played to the caller. For example, in response to a prerecorded message from the ACD 16 to the caller, the caller may use his or her touch-tone key pad of the calling device 20 to enter the requested information. The caller may be asked whether the call concerns a complaint or a purchase, or the caller may be asked to provide his or her social security number, credit card number, account number, and the like. The caller's entered response may be stored in the DNIS fields associated with the incoming call, and is thus available to the ACD 16.

Regardless of whether the ANI fields are used ascertain the caller's originating number or whether the DNIS fields provide requested information, the information obtained may be used directly, or such information may be used to access the database 100. Accordingly, in the above-described examples, information about the caller is available, such as name, account number, and the like.

In another specific embodiment, the contact evaluation parameter may be set to a "VIP" mode where the applicable business rule specifies that the priority of the incoming call may be based on the identity or importance of the caller. In this scenario, the caller's name is obtained from the database, based upon the ANI or DNIS fields associated with the incoming call. That name is then compared to a list of important names or a very important persons (VIP) list. Perhaps the individuals in the VIP list may have spent large sums of money with respect to transactions processed by the transaction processing system 16, or perhaps these individuals are officers of particular companies or leaders of the community. Any suitable criteria may be used to list such individuals in the VIP list, depending upon the nature of the business at hand. If the name of the person calling is found in the VIP list, the business rule may specify that the incoming call be assigned a high priority.

Of course, in some embodiments, the business rule or the VIP list may be set up so as to incorporate a hierarchy of priorities. For example, four or five levels of priority may be set up to account for four or five different priority levels associated with the individuals in the VIP list. There may exist "extremely" important persons, along side of merely "important" persons. Thus, the associated business rule may assign a certain priority to the incoming call depending upon the level of priority applicable to the caller, depending upon the nature of the business.

In another specific embodiment, the contact evaluation parameter may be set to a "purchase amount priority" mode where the applicable business rule specifies that the priority of the incoming call may be based on the amount of dollar volume or purchase order volume associated with the caller. In this scenario, the caller's account history may be obtained from the database 100. The applicable business rule may specific, for example, that if the caller has purchased over $2000 in goods or services within a predetermined period of time, for example, within the last three years, that that incoming call is assigned a high priority value.

Another specific embodiment may be the converse of the above-described embodiment. For example, if the caller is found to be delinquent in his or her payments, as ascertained from the database 100, that caller may be assigned a very low priority.

Note that the database 100, in some embodiments, may contain a large amount of information corresponding to the caller and the caller's transaction history. For example, the database 100 may contain information relating to product identification, sales order history, sales volume of ordered merchandise, dollar value of ordered merchandise, customer payment history, customer payment delinquency history and the like. Accordingly, the contact evaluation parameter may be based upon any of the data contained in the database and the associated business rule(s) may assign priority values depending upon the magnitude or value of such information.

In another embodiment, the contact evaluation parameter and business rules applied may be based on the content of the call rather than apriori information contained in the database 100. In this embodiment, the content of the incoming call is analyzed. For example, if the coming call is a text-based call, each word in the text message may be compared to a list of key words contained in the database. Such a key word list may be "universal" or general, rather than specific to an individual caller. Key words having a high priority may be, for example, "complaint," "problem," "angry" and the like. In this specific example, one business rule that may be applied may specify that any incoming call having any one or combination of these key words be assigned a high priority. In this way, callers with complaints or problems would be assigned a high priority so their problem could be resolved as soon as possible.

The above-described example may also be applicable to voice-based incoming calls if, for example, the incoming call is not immediately answered by an agent. For example, the caller may have the option of leaving a message, which may be recorded. A voice recognition processor 102 (FIG. 1) may the convert the recorded caller's speech to text, and the text may be analyzed in accordance with the above example. Such suitable speech recognition devices 102 or software may be, for example, but not limited to Dragon Naturally Speaking, Version 6, available from Dragon Systems, or ViaVoice For WINDOWS, Professional Edition, Release 9, available from IBM Corporation. The aforementioned voice recognition devices or software packages may be implemented as a software module, and thus, may run on the agent station 30. However, such voice recognition systems 102 may also include separate hardware signal processors, such as digital signal processors and other hardware-based components.

With respect to contact evaluation parameter and associated business rules based upon the content of the call, such a system permits the transaction processing system to be extremely agile and adaptive to changing business conditions. In one specific example that may be pertinent to a brokerage house application, a name of a particular stock or equity may be the focus of present method. If an important event occurred that involved that particular stock or equity, the contact evaluation parameter may be set to "equity name priority," and the associated business rule may specify that any incoming call that mentioned the name of a specific stock or equity be assigned a high priority. For example, if the name "ENRON" was mentioned in a call, that call may be given a high priority by the brokerage house. In that way, all calls that mentioned ENRON would be serviced quickly. Of course, conversely, if the name "ENRON" was mentioned in a call, the brokerage house may elect to give such an incoming call a low priority or even specify that such calls should not be answered at all.

In a similar example involving a brokerage house, the following example illustrates how the present method permits the transaction processing system to respond and adapt rapidly to changing business conditions. In this example, assume that there is a large decline in the stock market. In this case, the contact evaluation parameter may be set to a "key word" mode and the business rule applied may compare the text of the incoming messages (or a "voice to text" converted call) to key words such a "sell short" and other similar terms. Accordingly, those calls may be handled before other types of incoming calls.

It should be noted that for some of the above-described examples, the call evaluation parameter may be merged with the business rules. In other embodiments, the call evaluation parameter may specifically identify which business rule or rules should be applied. A two variable approach, however, is often more flexible and robust. In other words, it may be preferable to have a contact evaluation parameter separate and distinct from the business rules, where the contact evaluation parameter indicates the general type of criteria governing assignment of the priority value, and the business rule implements the specific evaluation of the priority level. An example of this is set forth above where the call evaluation parameter is set to "geographical priority" and the business rule assigns a high priority value to the call if it originated from Washington, D.C.

Further, determination of the contact evaluation parameter may in some embodiments be governed by the type of data available in the database pertaining to a particular call, and may also be governed by the amount and diversity of the data. For example, if there is no order history information in the database corresponding to an incoming call, the contact evaluation parameter typically will not be set to "purchase amount priority" because an intelligent decision regarding the priority of that incoming call could not be made on such a basis.

Specific embodiments of a novel inquiry resolution system for a transaction processing system have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. In a transaction processing system, a method for prioritizing and presenting incoming calls routed from callers through a communication network to an agent station having an associated agent, the incoming calls including voice-dialog communication and text-dialog communication, the method comprising the steps of:

receiving both voice-dialog and text dialog calls from the communication network;

determining at least one contact evaluation parameter associated with each call based on external real-world events, the contact evaluation parameter indicating a criteria governing identification of selected business rules, separate and distinct from the contact evaluation parameter, for evaluating priority of the call, said real-world events including a geographic location associated with an origin of the call, and a time period measured from receipt of the call to a time of close of business of the caller;

applying one or more of the selected business rules to the contact evaluation parameter to generate a priority value corresponding to each call;

assigning the corresponding priority value to each respective call;

displaying to the agent an indication of each of the calls based on the assigned priority value; and modifying the assigned priority value of the calls dynamically in real-time in response to the real-world events.

2. The method according to claim 1 wherein the call is processed to assign the priority value before it is routed to a selected agent station.

3. The method according to claim 1 wherein the call is automatically processed to assign the priority value after it is routed to a selected agent station.

4. The method according to claim 1 wherein the contact evaluation parameter is derived from information obtained from a database, the database being accessed based upon an identification of the call.

5. The method according to claim 4 wherein the database is accessed by an index or pointer derived from data contained in a DNIS (dialed number information service) or an ANI (automatic number identification) field associated with the incoming call.

6. The method according to claim 4 wherein the information obtained from the database is selected from the group consisting of customer name, product identification, sales order history, sales volume of ordered merchandise, dollar value of ordered merchandise, customer payment history, and customer payment delinquency history.

7. The method according to claim 1 wherein the contact evaluation parameter indicates a type of criteria governing assignment of the priority value and the business rule implements a specific evaluation of the priority level.

8. The method according to claim 7 wherein the geographical location of origination of the call is determined based on area code information contained in a DNIS or an ANI field associated with the call.

9. The method according to claim 4 wherein the contact evaluation parameter may not be a purchase amount priority when there is no prior order history information in the database corresponding to the call.

10. The method according to claim 1 wherein if the call is a voice-based communication, the contact evaluation parameter is set to voice-priority, and the business rule applied specifies that the call is assigned a priority value greater than all calls having a contact evaluation parameter other than voice-priority.

11. The method according to claim 1 wherein if the call is a text-based communication, the contact evaluation parameter is set to text-priority, and the business rule applied specifies that the call is assigned a priority value greater than all calls having a contact evaluation parameter other than text-priority.

12. The method according to claim 1 wherein if the call is a voice-based communication, the contact evaluation parameter is set to voice-priority, and the business rule applied specifies that the call is assigned a priority value based upon a chronological time that the call was received.

13. The method according to claim 10 wherein the business rule applied further specifies that the call is assigned a priority value based upon a chronological time that the incoming call was received.

14. The method according to claim 4 wherein the contact evaluation parameter corresponds to the customer name and the selected business rule compares the customer name to a VIP (very important persons) list to assign one of a plurality of levels of priority associated with the VIP list.

15. The method according to claim 7 wherein the selected business rule compares the geographical location of an origination of the call with a list of prioritized geographical locations to generate the priority value.

16. The method according to claim 4 wherein the priority value generated is based upon whether the caller is delinquent in payments based on information in the database.

17. The method according to claim 4 wherein the priority value assigned to the call is increased in priority if the time of receipt of the call is within a predetermined period of time of the close-of-business time of the caller.

18. The method according to claim 6 wherein the contact evaluation parameter corresponds to the sales order history and the selected business rule assigns a priority value proportional to a caller purchase amount.

19. The method according to claim 6 wherein the contact evaluation parameter corresponds to the customer payment delinquency history and the selected business rule assigns a priority value inversely proportional to a delinquent amount associated with the caller.

20. The method according to claim 1 wherein content of the call is analyzed and a priority value is generated based on analysis of the content.

21. The method according to claim 20 wherein analyzing the content of the call includes generating a list of key words based on the content of the incoming call and generating a priority value based on the list of key words.

22. The method of claim 21 wherein the step of applying the selected business rule further includes the step of comparing the generated list of keywords with a master key word list to generate a priority value.

23. The method of claim 22 wherein the master keyword list is universal and is applicable to a plurality of callers.

24. The method according to claim 1 wherein if the call is a text-based communication, the text of the call is analyzed and a priority value is generated based upon content of the text.

25. The method according to claim 1 wherein if the call is a voice-based communication, a speech-recognition processor converts the speech to text, and the converted text of the incoming call is analyzed to determine content and a priority value for the call is generated based upon the content.

26. The method of claim 1 wherein the contact evaluation parameter corresponds to an equity name priority and the selected business rule assigns a priority based upon a name of a specific equity.

27. The method of claim 1 wherein the contact evaluation parameter is determined by the type of data in the database pertaining to the call.

28. The method of claim 1 wherein the priority values are reassigned in real-time by changing the business rules, adding business rules, or by modifying the contact evaluation parameters in real-time.

29. A transaction processing system for prioritizing and presenting calls routed from callers through a communication network to an agent station having an associated agent, the calls including voice-dialog communication and text-dialog communication comprising:
   means for receiving both voice-dialog and text dialog calls from the communication network;
   means for determining a contact evaluation parameter associated with each call based on external real-world events, said real-world events including a geographic location associated with an origin of the call, and a time of receipt of the call relative to a close of business the caller;
   means for applying one or more selected business rules to the contact evaluation parameter to generate a priority value corresponding to each call;
   means for assigning the corresponding priority value to each respective call;
   means for displaying to the agent an indication of each of the calls based on the assigned priority value to permit the agent to service the calls in priority order; and
   means for modifying the contact evaluation parameters and business rules in real time thereby modifying the assigned priority value of calls with previously assigned priority values in real-time based on the real-world events.

30. The method according to claim 29 wherein if the call is a voice-based communication, the contact evaluation parameter is set to voice-priority, and the business rule applied specifies that the call is assigned a priority value greater than all calls having a contact evaluation parameter other than voice-priority.

31. The method according to claim 29 wherein if the call is a text-based communication, the contact evaluation parameter is set to text-priority, and the business rule applied specifies that the call is assigned a priority value greater than all calls having a contact evaluation parameter other than text-priority.

32. The method according to claim 29 wherein the contact evaluation parameters and business rules are modified in real time.

33. The method according to claim 32 wherein a database is accessed by an index or pointer derived from data contained in a DNIS or an ANI field associated with the incoming call.

34. A transaction processing system configured to prioritize and present calls routed from callers through a communication network to agent stations each having an associated agent, the calls including voice-dialog communication and text-dialog communication, the system comprising:
   at least one communication processor operatively incorporated into or coupled to the transaction processing system to facilitate sending and receiving the voice-dialog communication and text-dialog communication between callers and the agents;
   a contact evaluation parameter associated with each call and applying one or more selected business rules to the contact evaluation parameter to generate a priority value corresponding to each call and to assign the priority value to each call;
   said contact evaluation parameter selected based on real-world events, said real-world events including a geographic location associated with an origin of the call, and a time from receipt of the call to a close of business of the caller;
   a plurality of agent stations operatively coupled to the communication processor, each agent terminal having a display screen to display a list of pending calls and to display on the display screen an indication of each of the calls based on the assigned priority value to the associated agent so that the agent services the calls in priority order, wherein the assigned priority value is modified in real-time based on the real-world events.

35. A computer readable memory or data storage means encoded with data representing a computer program for a transaction processing system, the system configured to prioritize and present calls routed from callers through a communication network to an agent station having an associated agent, the calls including voice-dialog communication and text-dialog communication, the computer readable memory or data storage means comprising:

means for receiving incoming voice-dialog and text dialog calls from the communication network;

means for determining a contact evaluation parameter associated with each call based on external real-world events;

means for applying one or more selected business rules to the contact evaluation parameter to generate a priority value corresponding to each call;

means for assigning the corresponding priority value to each respective call;

means for displaying to the agent an indication of each of the calls based on the assigned priority value; and;

means for updating the assigned priority value in real-time based on the real-world events, said real-world events including a geographic location associated with an origin of the call, and a time from receipt of the call to a close of business of the caller.

* * * * *